United States Patent [19]
Stepanek

[11] Patent Number: 5,766,734
[45] Date of Patent: Jun. 16, 1998

[54] COLD TRANSFER OF HOLOGRAPHIC IMAGES

[75] Inventor: Michael J. Stepanek, Hollis, N.H.

[73] Assignee: Hampshire Holographic Manufacturing Corp., Milford, N.H.

[21] Appl. No.: 855,318

[22] Filed: May 13, 1997

Related U.S. Application Data

[63] Continuation-in-part of Ser. No. 679,347, Jul. 9, 1996, Pat. No. 5,662,986, and Ser. No. 679,348, Jul. 9, 1996, Pat. No. 5,735,989.

[51] Int. Cl.⁶ ........................................... B32B 3/00
[52] U.S. Cl. ..................... 428/195; 428/174; 428/221; 428/332; 428/488.4; 428/537.5; 428/913; 428/914; 156/247
[58] Field of Search ..................... 428/174, 195, 428/221, 332, 488.21, 337.5, 913, 914; 156/247

[56] References Cited

U.S. PATENT DOCUMENTS

| | | | |
|---|---|---|---|
| 5,155,604 | 10/1992 | Miekka et al. | 359/2 |
| 5,248,544 | 9/1993 | Kaule | 428/195 |

*Primary Examiner*—William Krynski
*Attorney, Agent, or Firm*—Stephen W. White

[57] ABSTRACT

An improved holographic image that has been transferred from a conventional polymeric support to a tissue paper substrate at reduced temperatures is described in this invention. A host of images may be envisioned and since this image, on tissue paper substrate, may then be wound up in a roll, it can be used within the paper industry for a host of processes such as in the wrapping of candies, gums, gifts and the like. This element and process permits the wide spread use of such holographic images, such use not being available until now. The holographic image is improved over that transferred at a somewhat higher temperature range.

8 Claims, 2 Drawing Sheets

COLD TRANSFER OF HOLOGRAPHIC IMAGES

CROSS-REFERENCE TO RELATED APPLICATIONS

This application is a continuation-in-part of Ser. No. 08/679,347, filed Jul. 9, 1996 now U.S. Pat. No. 5,662,986 and U.S. Ser. No. 08/679,348, filed Jul. 9, 1996, now U.S. Pat. No. 5,735,989.

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. Still further, this invention relates to a unique process for transferring holographic images to a relatively inexpensive substrate which permits a wide-spread use of said holographic image.

2. Description of the Prior Art

Holographically enhanced materials are well known in the prior art. These are usually made by very proprietary methods which includes passing a layer of plastic, for example, through a machine which imparts a variation (e.g. which can be an image itself) within covering or upper strata of the plastic layer. This step is somewhat similar to, but not exactly the same, as embossing. A powdered metallic element (e.g. aluminum) is then applied thereon by the so-called metallizing process. After this step, the element appears to have a two or three dimensional diffractional grating holographic image imparted on the layer of plastic. This image is extremely pleasing and is widely used within the credit card and security industries, for example, to impart an image particular to that credit card or to provide a security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" method") are usually small in size and thus cannot be imprinted with larger images. Thus, this material has not been widely used outside of the credit card and novelty industry.

Within the food packaging industry it is known use foils and the like for the wrapping of individual food pieces, for example. Sometimes, these foils are embossed with decorative or advertising logos and materials. In addition, it is known in this industry to laminate with glues metallized materials to paper elements for the wrapping of individual food pieces such as candies, gums and the like, for example. There is a long standing need, however, to be able to transfer holographic elements at reduced temperatures on to paper tissue materials that can be used in a variety of applications such as wrapping, advertising, etc.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (tissue paper useful within the paper industry, wrapping elements, advertisement sheets and the like), the use of holographically prepared images would find wider use in the use of these paper tissues.

There is also a pressing need in the industry to have an improved holographic image on the aforementioned tissue papers and also to reduce the production costs associated therewith.

SUMMARY OF THE INVENTION

It is an object of this invention to provide a holographic image that can be transferred to another substrate. It is a further object to utilize a unique transferring process that can place a holographic image directly on a cheaper cellulosic substrate such as tissue paper, for example. These and yet other objects are achieved in a tissue paper substrate having two, flat surfaces, said tissue paper substrate having a holographic image having imparted thereon by laminating at a temperature of between $-2°$ C. and $24°$ C. and a pressure of greater than 0.15 pounds per square inch a holographic image on a polymeric substrate to one side of said tissue paper substrate and subsequently delaminating said paper tissue substrate from said polymeric substrate whereby said holographic image is transferred to said paper tissue substrate.

In yet another embodiment, this invention may be achieved in a process for transferring a holographic image to a paper tissue substrate by laminating a metallized holographic image, said image having been imparted on a polymeric substrate, to said paper tissue substrate at a temperature greater than about $-2°$ C. and a pressure greater than 0.15 pounds per square inch and subsequently delaminating said paper tissue substrate from said polymeric substrate, whereby said metallized holographic image is transferred to said paper tissue substrate and said holographic image on said polymeric substrate may be reused.

DETAILS OF THE INVENTION

Figure 1:
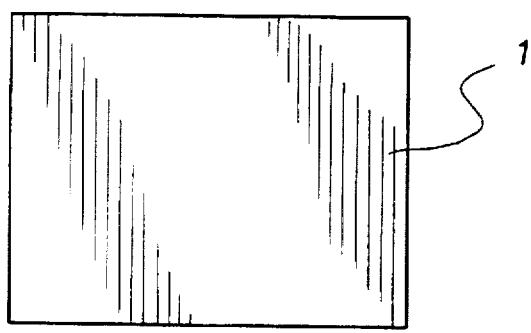
FIG. 1 is a top view of an actual prior art holographic image prepared by the process described above and contained on a polymeric substrate.

Looking now specifically at the drawings which schematically show the holographic image which is transferable from a polymeric substrate to a more board stock element, FIG. 1 is a top view of an actual holographic image 1 contained on a polymeric substrate. The image has that 3- or 2-D holographic look that is well-known in the prior art, especially in the security art field.

Figure 2:
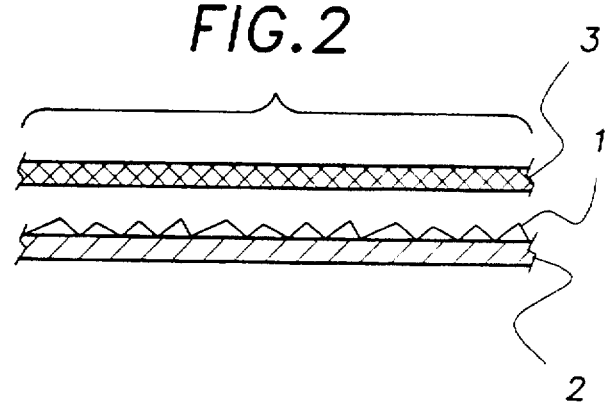
FIG. 2 is a drawing of a side view of FIG. 1. A paper tissue substrate is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. A tissue paper substrate 3 is shown located directly above the image.

Figure 3:
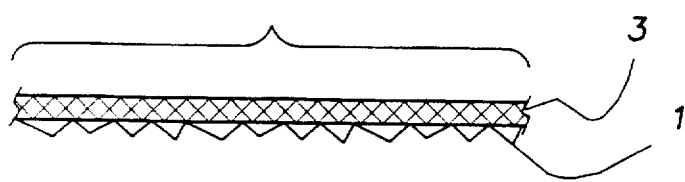
FIG. 3 is a drawing of a side view of a holographic image that has been transferred from the element of FIG. 1 directly to the paper tissue substrate of FIG. 2

In FIG. 3, the holographic image 1 has been transferred to the tissue paper substrate 3.

Figure 4:
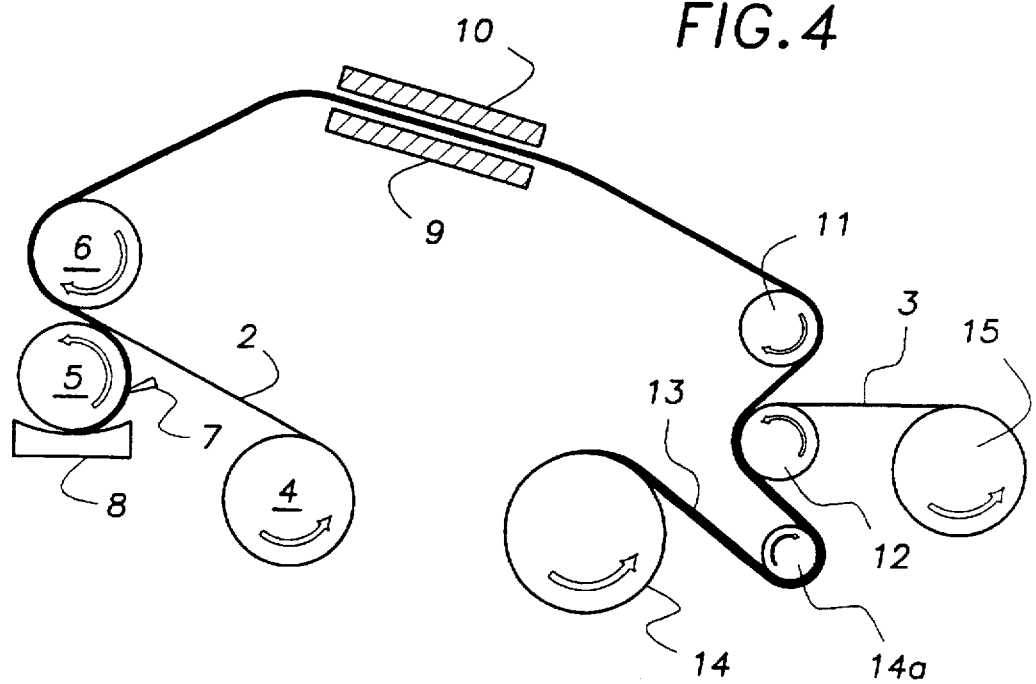
FIG. 4 is a drawing of a schematic process for the lamination of a prior art polymeric substrate containing a holographic image to a paper tissue substrate.

FIG. 4 is a schematic drawing representing a novel process of this invention for the transfer of a holographic image from a polymeric substrate to a tissue paper substrate. In this figure, a holographic image 1 (not seen in this figure) on a polymeric substrate 2 is shown being pulled off an unwind roll 4 in a nip formed by opposing rollers 5 and 6. In this view, roll 5 is a standard gravure coating roll and roll 6 is a backup roll. A gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a tissue paper substrate 3 taken from a roll 15 contacts the surface of the adhesive containing side of the dried, holographic image 1 contained on a polymeric substrate 2 and is laminated thereto. The rolls, which may be heated or cooled, activate the dried adhesive in order to permit such a lamination to occur. The resulting sandwich 13 is then passed over a chill roll 14a and then taken up by rewind roll 14.

Figure 5:
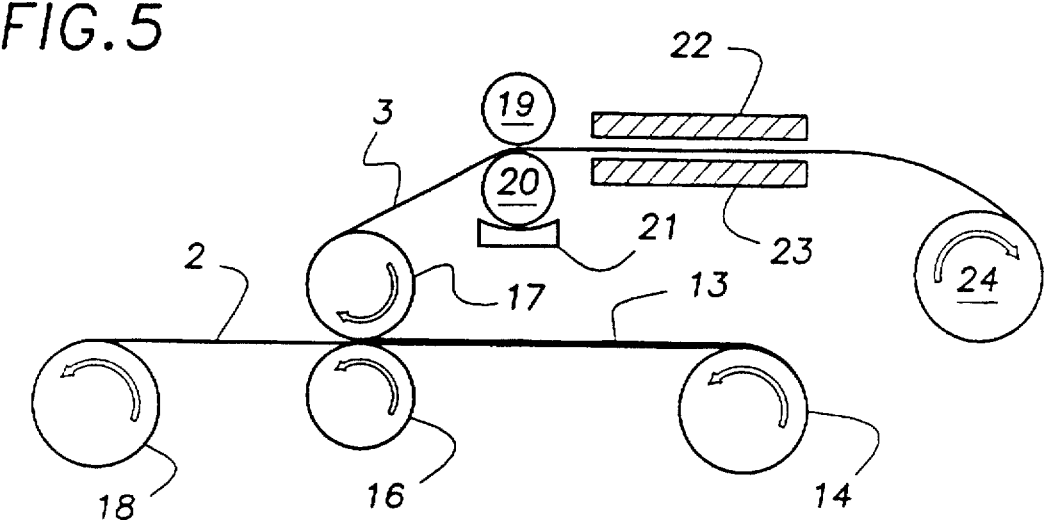
FIG. 5 is a drawing of a schematic process of direct delamination of the polymeric substrate from the paper tissue substrate to produce the holographic image of FIG. 2 directly on the paper tissue substrate.

The process of delamination is shown in FIG. 5. In this schematic drawing, the laminated sandwich material 13 is drawn off unwind roll 14 and taken through the nip of two delamination rolls 16 and 17. The even pull of the delamination rolls causes the holographic image to transfer from the polymeric substrate 2 to the tissue paper substrate 3. It is surmised that the holographic image, which has a glue surface on the top surface thereof, has a stronger affinity for the tissue paper substrate 3 than the polymeric substrate 2. The polymeric substrate 2 is then taken up on a film rewind roll 18 (this material can subsequently be reused and recycled by re-metallizing the image that has been etched thereon). The tissue paper substrate 3 now carrying the holographic image 1 thereon is taken up to coating heads 19 and 20. A protective layer may be applied over the holographic image contained on this tissue paper substrate in order to protect this image during handling. This may be applied at the nip of the coating heads and a pan 21 is graphically shown in this view. The holographic image on the tissue paper substrate is then carried into another drier to insure that the protective coating is hardened prior to be rolled up on to a final roll 24. The roll of holographically imaged tissue paper substrate is now ready to use in a whole host of processes within the paper industry, such as wrapping paper, advertisements and the like, for example.

Figure 6:
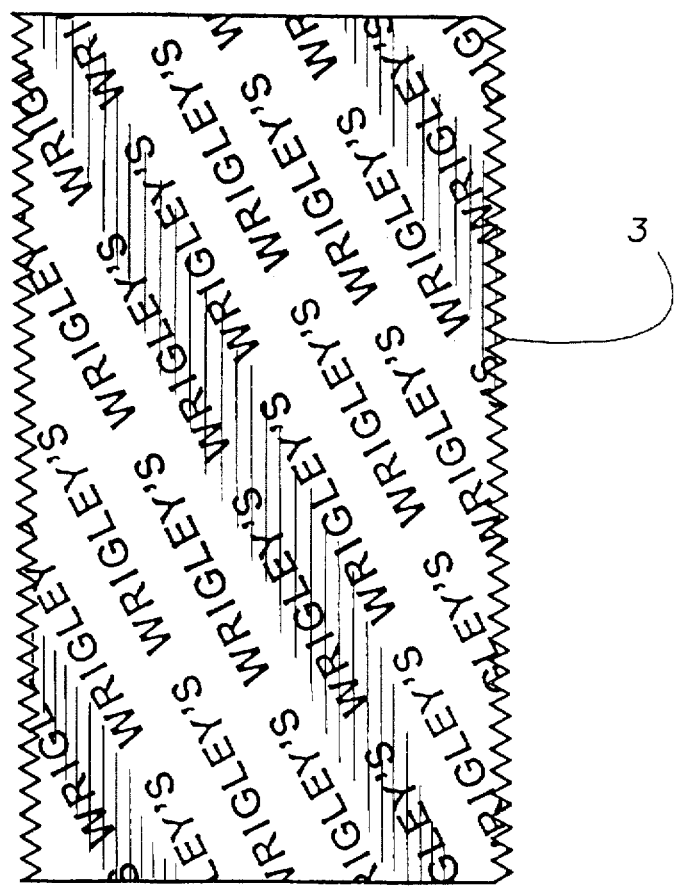
FIG. 6 is a top view of a wrapping element made using the tissue paper substrate of this invention. In this view, a holographic advertisement image is contained directly on the tissue paper element.

In FIG. 6, a top view of a typical tissue paper substrate 3 is shown with a holographic advertisement (e.g. Wrigleys™) contained thereon.

Temperatures for laminating the holographic image contained on a polymeric substrate to a tissue paper substrate are colder than taught in my previously filed application (U.S. Ser. No. 08/679,347, filed Jul. 9, 1996 and allowed Apr. 15, 1997) from which this application depends. I have found that if the lamination rolls are chilled between −2° C. and 24° C. the holographic image that is later transferred from the polymeric substrate to the tissue paper substrate is more brilliant and less distorted than at somewhat higher temperatures. This in no way is meant to indicate that the image produced and taught in my previously filed application referred to above is not a quality image with high utility within the art. However, the image produced in the instant invention has a slightly better quality and brilliance. In addition, the use of the temperatures within the teachings of this invention result in a higher line speed during the production and thus a considerable savings in cost.

A pressure greater than 0.15 pounds per square inch and up to 1,000 pounds per square inch may be used, although I prefer 5 to 10 pounds per square inch.

It is most important that the temperature of any step of this process not be greater than 250° C. in order not to harm or deform the holographic images in any way. It was previously thought that since the material that made up a holographic image and the glues used therewith, would begin to degrade at 150° C. However, new materials and glues and the like can be heated at even higher temperatures. Looking again at FIG. 4, the conditions in the drier should be such that the surface of the polymeric substrate 2 carrying the holographic image 1 and a layer of adhesive material, be somewhere between 0° C. and 250° C. and most preferably 25° to 125° C. One can design a drier which has a proper length and can emanate the proper degree of heat to match up with the web speed which is passing through this drier. The heated nip also should have a temperature of between 0° C. and 250° C. The purpose of the chill roll 14a is to set up the adhesive and insure that the board tissue paper substrate 3 and holographic image 1 on the polymeric substrate 2 is secured. The adhesive material is well-known in the coating art and can be applied at a coating weight of between 0.5 to 14 pounds (dry) per ream of tissue paper, wherein a ream is 500 sheets of tissue paper of 24 inches by 36 inches in size, and can be applied either to the tissue paper substrate or to the holographic image layer on the polymeric substrate. Within the drawings which make up some of the best modes as envisioned at the time of filing of this invention, the adhesive layer is shown being applied to the holographic image first. Then, the tissue paper substrate contacts this layer at the cooled nip rolls and is adhered thereto.

The protective layer that is applied over the top of the holographic image that has been transferred to the board tissue paper substrate by delamination, as shown in FIG. 5, can be any of a host of conventional materials such as solvent or water based acrylics, for example. This protective layer may be colored or tinted to provide requisite color matching to colored tissue papers, for example.

I can use a host of tissue paper substrates within the metes and bounds of this invention. For example, if one wishes to have a holographically enhanced wrapping paper tissue for a host of applications, regular wrapping paper tissue may be used within the ambit of this invention. By tissue paper I mean that which is said to have 5 to 24 pounds per ream, with a ream defined as 500 sheets of paper tissue of 24 inches by 36 inches in size. This paper tissue is particularly useful since it has such a low weight and thus can be used to wrap up small items such as gum, candies and the like. A holographic image placed thereon thus has high utility.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The tissue paper substrates on which the holographic images have been transferred may be used in a host of applications including the wrapping of candies, and gums; gifts; store wrappings; decorative wrappings and advertising substrates, for example. These advertising substrates will find wide use within the various industries that employ wrappings and tissue papers of this sort.

The ability to dry-bond laminate and then to delaminate the elements described within this invention represents a unique process since it was not widely known that holographic images could be so transferred. The process as described above uses some unique equipment that is designed to hold, laminate and then delaminate tissue paper substrates. It was not known in the prior art to provide such tissue paper substrates, especially when the holographic image transferred thereto has such brilliance and high quality. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

What is claimed is:

1. An improved holographically enhanced tissue paper wrapping element comprising a tissue paper substrate having two, flat surfaces, wherein said holographic enhancement is achieved by laminating at a temperature of between −2° C. and 24° C. and a pressure greater than 0.15 pounds per square inch a holographic image contained on a polymeric substrate to one of said surfaces of said tissue paper substrate and subsequently delaminating said paper tissue substrate from said polymeric substrate whereby said holographic image is transferred to said paper tissue substrate.

2. The improved holographic image on the tissue paper substrate of claim 1 wherein said temperature is greater than 0° C. and said pressure is greater than 0.25 pounds per square inch.

3. The improved holographic image on tissue paper substrate of claim 1 wherein said temperature is between 0° C. and 24° C. and said pressure is between 0.15 and 1.000 pounds per square inch.

4. The improved holographic image on tissue paper substrate of claim 1 wherein said temperature is between 10° C. and 24° C. and said pressure is between 5 to 10 pounds per square inch.

5. The improved holographic image on tissue paper substrate of claim 4, wherein said tissue paper substrate has a weight of between 5 and 24 pounds per ream, wherein said ream is defined as 500 sheets of 24 by 36 inch tissue paper.

6. The tissue paper substrate of claim 4 wherein said improved holographically enhanced tissue paper is a food wrapping element.

7. The improved holographically enhanced tissue paper wrapping paper of claim 6 wherein said holographic enhancement is a logo.

8. The improved holographic tissue wrapping paper of claim 7 wherein said paper is used to wrap a gift and said paper is colored.

* * * * *